(12) United States Patent
Mayr et al.

(10) Patent No.: US 8,002,639 B2
(45) Date of Patent: Aug. 23, 2011

(54) TORSIONALLY RIGID FLEXIBLE COUPLING, IN PARTICULAR FULLY-STEEL COUPLING

(75) Inventors: Fritz Mayr, Mauerstetten (DE); Johann Huber, Oberegg (DE)

(73) Assignee: Chr. Mayr GmbH & Co. KG, Mauerstetten (DE)

( * ) Notice: Subject to any disclaimer, the term of this patent is extended or adjusted under 35 U.S.C. 154(b) by 373 days.

(21) Appl. No.: 12/224,531

(22) PCT Filed: Mar. 1, 2007

(86) PCT No.: PCT/EP2007/001743
§ 371 (c)(1),
(2), (4) Date: Nov. 3, 2008

(87) PCT Pub. No.: WO2007/098941
PCT Pub. Date: Sep. 7, 2007

(65) Prior Publication Data
US 2009/0131179 A1    May 21, 2009

(30) Foreign Application Priority Data
Mar. 2, 2006    (DE) .......................... 10 2006 009 594

(51) Int. Cl.
*F16D 3/79*    (2006.01)
(52) U.S. Cl. .......................... 464/98; 411/534
(58) Field of Classification Search .................... 464/69, 464/93–95, 98, 99; 411/534; 16/2.1
See application file for complete search history.

(56) References Cited

U.S. PATENT DOCUMENTS

| | | | | |
|---|---|---|---|---|
| 2,181,888 A * | 12/1939 | Gustin | ............................. | 464/69 |
| 2,308,881 A * | 1/1943 | Jencick | ........................... | 464/69 |
| 2,639,595 A | 5/1953 | Werner | | |
| 3,835,615 A * | 9/1974 | King, Jr. | | |
| 4,708,692 A | 11/1987 | Weiss | | |
| 4,846,761 A * | 7/1989 | Weiss | ............................... | 464/69 |
| 5,888,140 A * | 3/1999 | Klingler et al. | .................. | 464/99 |
| 6,315,670 B1 * | 11/2001 | Andra et al. | .................... | 464/69 |

FOREIGN PATENT DOCUMENTS

| | | |
|---|---|---|
| DE | 26 25 550 A1 * | 12/1977 |
| DE | 197 09 950 A1 | 11/1997 |
| DE | 197 09 951 A1 | 11/1997 |

* cited by examiner

*Primary Examiner* — Gregory Binda
(74) *Attorney, Agent, or Firm* — W. Norman Roth

(57) ABSTRACT

A torsionally rigid flexible shaft coupling, in particular, fully-steel shaft coupling, for transmitting torques between shafts, in particular shafts with axes which are offset relative to one another, having one or two plate packs (5) which are placed on flange sleeves (6) and on the latter, are clamped by means of a ring (4) against an end-side flange (65*b*) of the flange sleeve (6), wherein the plate packs are clamped in an alternating fashion in the peripheral direction to the sleeves (8) or second hubs (9), which face one another, by means of screws (7) which extend through the flange sleeves (6) and have nuts (2). In order to considerably increase the torque which can be transmitted, it is provided that the flange sleeve (14) is shorter in the axial direction than the known flange sleeves, and that, in order to increase the torque component which can be transmitted in a frictionally locking manner, the flange sleeve is rounded in a chamfered manner, and contains a coated radius geometry (6*e*), in its transition region to the planar face of the hub (1).

5 Claims, 3 Drawing Sheets

TORSIONALLY RIGID FLEXIBLE COUPLING, IN PARTICULAR FULLY-STEEL COUPLING

BACKGROUND OF THE INVENTION

The invention relates to torsionally rigid flexible shaft couplings of the type exemplified in German published patent documents DE 197 09 950 B4 and DE 197 09 951 C2, each owned by the assignee of the present invention.

In the conventional embodiments of these couplings, what is sought is as high a torque to be transmitted in combination with a sufficient ability of accepting misalignment (i.e., angular axial and radial misalignment) of the various parts of the coupling relative to each other.

In order to provide for a sufficient misalignment in known couplings, sufficient clearances must be present between plate packs 5 and the hub 1 or sleeve 8 of the coupling (see especially FIGS. 2 and 3). In this respect, an important measure is the distance 10 between the planar hub face and the face of the plate pack, which corresponds to the flange clearance of the flanged sleeve engaging the hub.

In the prior art, the ratio of the flange clearance 10 in FIG. 2 to the outer diameter 16 in FIG. 4 is 1:40 at most, or smaller.

The surfaces of the coupling plates may be roughened as described in DE 197 09 951 C2 so that a relatively low bias will suffice to frictionally transmit comparatively high torques to the flanged sleeves and, thence, to the hub. If the geometry of the flanged sleeves corresponds to DE 197 09 950 B4, an absolute clearance between the plates, the hub and the adjoining sleeve will be safely maintained at normal power densities.

After laser equipment and other laser test gear have greatly enhanced the users' abilities of ascertaining the radial and angular misalignments to be leveled out by the coupling, it is not the main concern any longer to compensate for high misalignments of torsionally rigid flexible shaft couplings but more so their power density, with poser density being defined as a torque as high as possible transmissible with an outer diameter as small as possible.

The problem underlying the present invention is to substantially raise the torque transmissible frictionally and, thus, without any play, by means of a torsionally rigid flexible friction-type coupling, This problem is solved by the present invention.

The proposed design accepts a reduction of the misalignment to 50% to 75% of the otherwise conventional values. By reducing the misalignment to approx. 50% to 75%, the required clearances between hub 1 and plate pack 6, or between plate pack 5 and sleeve 8, can be reduced so as to enable higher stiffness within plate pack 5 to be provided.

As shown in the prior art FIGS. 1-3, lever arm 11 between the center of plate pack 6 and the planar end face of hub 1 creates by way of the existing circumferential force 12 in FIG. 3 a bending torque 15 in FIG. 3 acting upon flanged sleeve 6 and the threaded bolt 7 installed in the through-bore of that sleeve, In the state-of-the art situation shown in FIGS. 1-3, very high bending torques may, in extreme cases, cause the flanged sleeve to lift off or disengage on one side, causing inadmissible increases of the bending torque component acting on the bolt—this can lead to potential fracture of the bolt or the sleeve under the dynamic loads acting on the bolt.

At a coefficient of friction equal to 0.1 between flanged sleeve 6 and hub 1, the torque acting between the sleeve and the hub is transmitted via combined frictional and positive (i.e. shape-locked) engagement. In the prior art of DE 197 09 951, coefficients of friction of 0.3 may be obtained by partially roughing the plates in the bolted area of threaded connection. As a result, the torque frictionally transmissible in the plate pack is higher by a factor of 3 than that transmissible between the flanged sleeve and the hub. For compensating the difference, the existing positive engagement is used, although this will result in corresponding loads on, and thus deformation in, the flanged sleeves. Very high torques may cause considerable micromovements between the flanged sleeve and the hub and consequently result in frictional corrosion as well as slip between the input and output sides.

In accordance with the invention, the flanged sleeves are coated in the areas of radiussed recess 6e, thus substantially increasing the frictionally transmissible component of the torque. The surface roughening may be obtained by abrasive blasting (e.g. sand blasting) or by coating (e.g. Durni Disp SiC or Ekagrip). In the process, the flanged sleeve is roughened, with the different hardnesses of the materials to be combined being important. The flanged sleeve must be harder than the surfaces of engagement.

Further the flanged sleeves are made of high=strength heat-treated steel (such as 42CrMo4 or 51CrV4 with a yield strength of at least 750N/mm$^2$) so that existing loads will be sustained.

In accordance with the invention, and in contrast to the state of the art in DE 197 09 950 B4, the axial length of the flanged sleeve is reduced as far as possible so as to keep the distance between the planar hub face and the plate pack face (flange clearance 10 in FIG. 2) as small as possible. As a result, lever arm 11 in FIG. 2, as well as the bending torque 15 in FIG. 3 acting on flanged sleeves 6, will be markedly reduced.

Further the plates in the plate pack used in accordance with the invention are selected to be thicker, as shown in FIGS. 4 and 5, so as to reduce the buckling load of the pressure-loaded segments of a plate pack.

The aforesaid measures result in an increase of the transmissible torque by a factor of 1.8 to 2 over the current state of the art. Another advantage is that the unchanged bolt dimensions and the identical radiussed geometry of the flanged sleeves make possible an easy and effortless replacement of prior art plate packs by torque-optimized ones.

BRIEF DESCRIPTION OF THE DRAWINGS

FIG. 4 shows a detail of the invention with reduced flange clearance at reference 13 and coated radius geometries at 6e and thicker plates at 5a;

DETAILED DESCRIPTION

Figure 1:
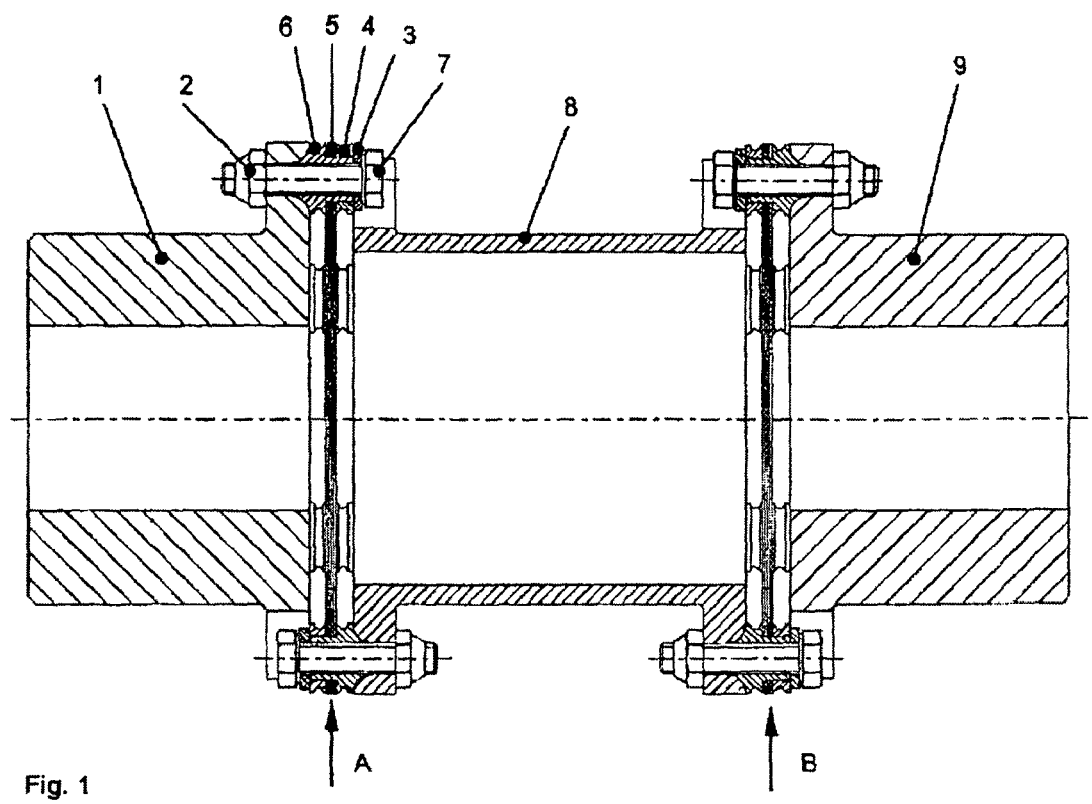
FIG. 1 shows a longitudinal section of the prior arty construction.
Figure 2:
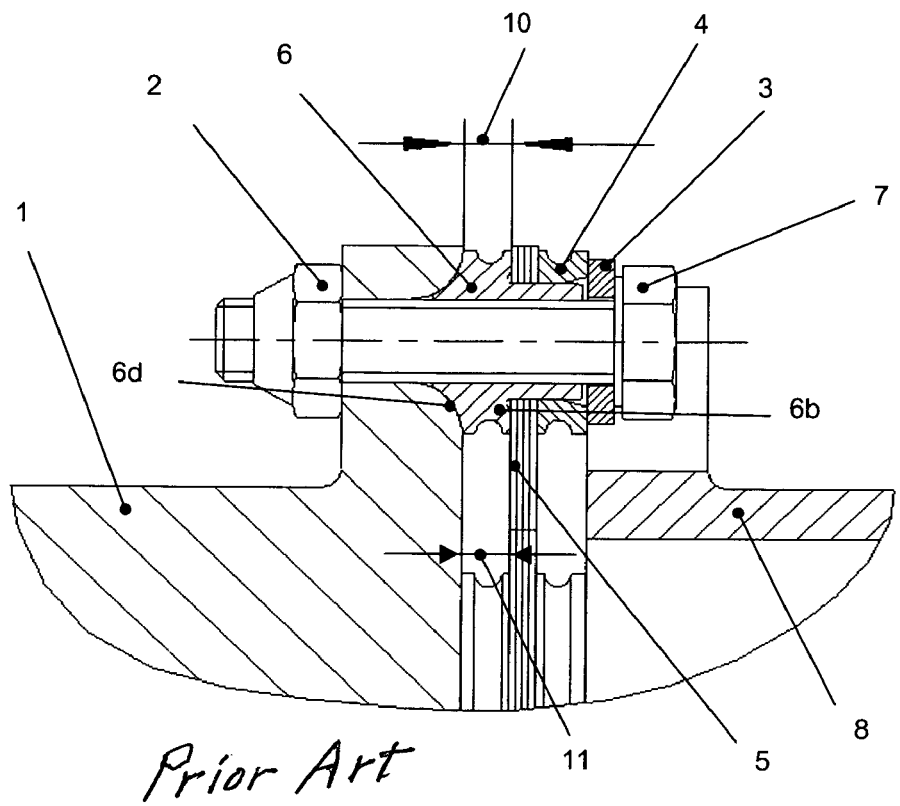
FIG. 2 shows a detail of the prior art design with the prior art flange clearance at reference 10 and lever arm at reference 11.
Figure 3:
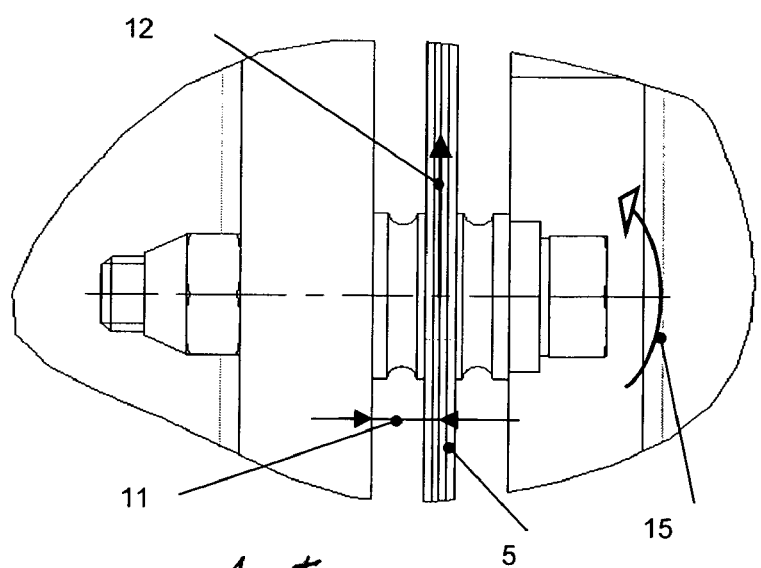
FIG. 3 shows the circumferential force at reference 12 and the bending torque at reference 15.
Figure 4:
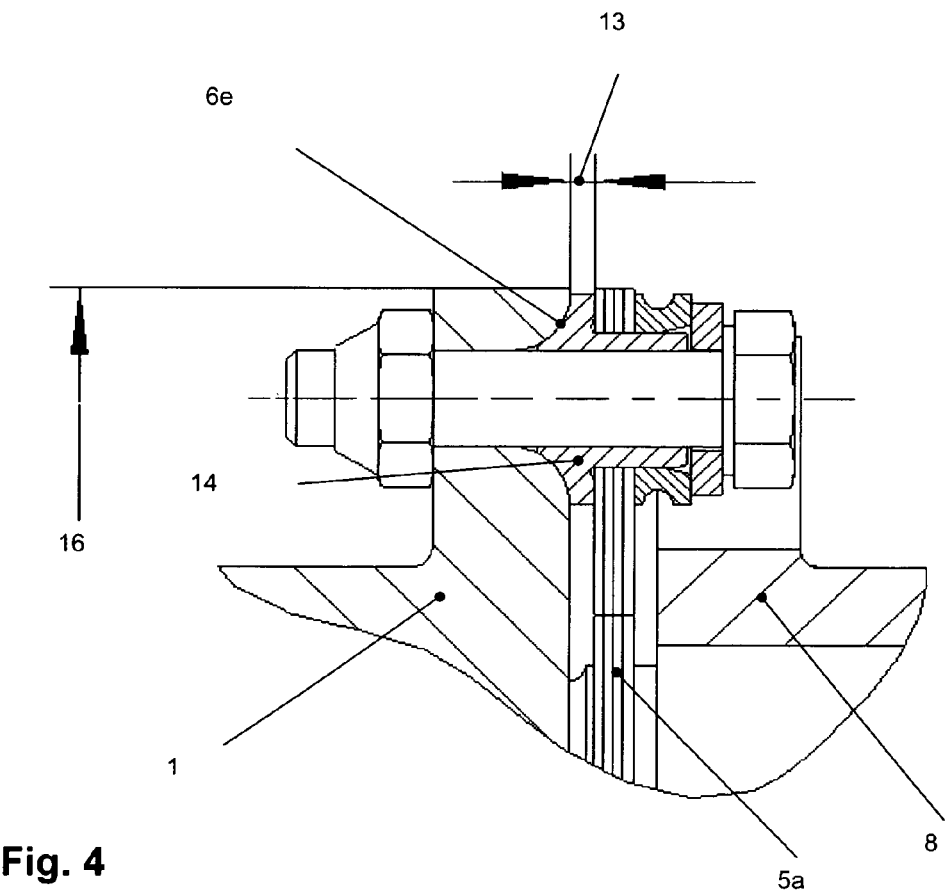
Figure 5:
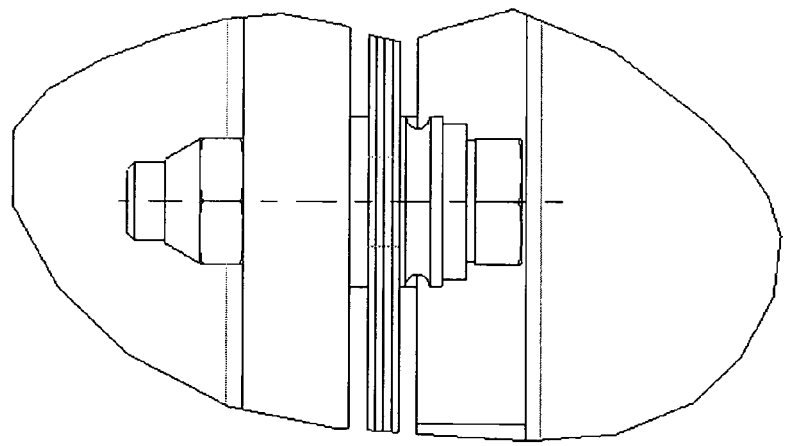
FIG. 5 shows the assembly of FIG. 4 in a sectional plan view with the reduced flange clearance at reference 13.

In the drawings, FIGS. 4 and 5 show an embodiment of the invention; the differences thereof will be explained under reference to the prior art as shown in FIGS. 1 to 3 and in comparison therewith.

FIG. 1 shows a torsionally rigid flexible or flexurally resilient shaft coupling for torque transmission under conditions of simultaneous radial, axial and angular misalignment, especially a full-steel coupling comprising a first terminal hub 1

(for connection to a first shaft not shown), an intermediate sleeve 8 and a second hub 9 at the other end (for connection to a second shaft, also not shown). Torque transmission from hub 1 via sleeve 8 to second hub 9 is effected through two plate packs 5 (shown in FIG. 1 on the right- and lefthand sides of sleeve 8). Plate pack 5 is compressed via several plates within flanged sleeve 6 by means of a ring 4 and a washer 3 as well as a threaded bolt 7 and a nut 2. A flange 6b on flanged sleeve 6 has a recessed radius 6d on one side thereof facing the hub 1.

As a detail of the FIG. 1 construction, FIG. 2 shows the mounting of plate pack 5 including the flanged sleeve 6, ring 4 and washer 3 by means of threaded bolt 7 and nut 2. Also shown are the conventional clearance (of flanged sleeve 6) at reference 10 and the lever arm (as influenced thereby) at reference 11 as conventionally used in the prior art.

FIG. 3 shows the circumferential force (reference 12) at a fastening point of the plate pack 5 and the resultant bending torque (reference 15) when the coupling operates to transmit torque.

FIG. 4 shows (at reference 13) the flange clearance (reduced from the prior art in FIGS. 1-3) of the novel, axially shortened flanged sleeve 14, which additionally is provided with a coated or abrasively blasted radiussed geometry 6e and, thus, with a higher coefficient of friction. As shown at reference 6e, this is meant to indicate that the axially shortened flanged sleeve is radiussed or rounded to form a concave fillet. In FIG. 4, the ratio of the shortened flange clearance 13 to the outer diameter of the coupling shown at 16 is at least 1:(50 or more). Stated differently, dimension 16 is at least 50 times larger than dimension 13.

Further, and in contrast to the state of the art in FIGS. 1-3, the present invention uses thicker plates 5a; in conjunction with the shortened flanged sleeves, this results in the total distance between hubs 1 and 9 being somewhat shorter than in the prior art.

FIG. 5 shows (a part of) the inventive shaft coupling design of FIG. 4 in a plan view.

The invention claimed is:

1. A torsionally rigid, full steel flexible shaft coupling for torque transmission between shafts having their axes displaced from each other, comprising:
    a hub having an end surface;
    a sleeve axially aligned with said hub;
    a plurality of flanged sleeves and clamping rings; and
    lamella disks on said flanged sleeves between a ring and a shoulder on the face of said flanged sleeves, said lamella disks being peripherally clamped between said rings and shoulders by threaded nuts and bolts extending through said flanged sleeves, said flanged sleeves having fillet surfaces at their transition to said end surface of said hub, and wherein an axial distance between said shoulders on said flanged sleeves and said end surface of said the hub is related to an outer diameter of the coupling in the ratio of 1:(50 or more), and said fillet surfaces have a coefficient of friction to increase the frictionally transmissible proportion of the torque.

2. The coupling of claim 1, wherein said coefficient of friction of said fillet surfaces is provided by abrasive blasting or by a coating.

3. The coupling of claim 1, wherein said flanged bushings are made of high-strength heat treated steel.

4. The coupling of claim 1, wherein said fillet surfaces are rounded.

5. The coupling of claim 4, wherein said fillet surfaces are concavely rounded.

* * * * *